United States Patent Office 3,536,510
Patented Oct. 27, 1970

3,536,510
HIGH SOLIDS TiO₂ SLURRY
Alvin Allen and Thomas S. Wollenberg, Wilmington, Del.,
 assignors to E. I. du Pont de Nemours and Company,
 Wilmington, Del., a corporation of Delaware
No Drawing. Filed Nov. 20, 1967, Ser. No. 684,495
Int. Cl. C09c 1/36, 3/02
U.S. Cl. 106—300                                    7 Claims

ABSTRACT OF THE DISCLOSURE

A high solids, aqueous slurry of TiO₂ pigment containing (1) from about 60% to about 80% by weight of dry-finished anatase pigment bearing from about 0.05% to about 1% by weight, based on the weight of the pigment, of an amine (preferably an alkanolamine) as a dispersing agent and (2) from about 0.01% to about 1% by weight, based on the weight of the pigment, of a polysaccharide as an anti-settling agents.

BACKGROUND OF THE INVENTION

TiO₂ pigments have been used for many years in the paper making industry to impart brightness and opacity to paper products. These pigments have been used in paper coatings, and they have also been incorporated into the paper itself, during the paper making process. The preferred method for adding TiO₂ during the paper making process is by the controlled addition of a TiO₂ slurry of known concentration. However, TiO₂ slurries of high solids content are usually dilatant in flow characteristics (i.e., the viscosity of the liquid is raised as the shear stress is increased), making them difficult to pump and the solids tend to settle out and cake during storage and transportation.

THE PRIOR ART

The use of ethanolamines to produce a water-dispersible titanium dioxide pigment is described in U.S. 2,744,029 dated May 1, 1956 to Kingsbury. Furthermore, the use of an alkali salt to carboxymethylcellulose in impact-milled mixtures with titanium dioxide to improve the retentiveness of the titanium dioxide in paper is taught to U.S. 3,205,085 dated Sept. 7, 1965 to Bailin. Neither patent, however, suggests a composition having the properties of the composition of the present invention, i.e., a pumpable, high solids titanium dioxide aqueous slurry of the low settling characteristics.

SUMMARY OF THE INVENTION

In accordance with the present invention, an aqueuos slurry of TiO₂ pigment of high solids content is provided which is readily pumped and which may be stored for extended periods without settling to a hard cake. The high solids, aqueous slurry of TiO₂ pigment of the present invention contains (1) from about 60% to about 80% by weight of dry-finished anatase pigment bearing from about 0.05% to about 1% by weight, based on the weight of the pigment, of an amine (preferably an alkanolamine) as a dispersing agent and (2) from about 0.01% to about 1% by weight, based on the weight of the pigment of a polysaccharide as an anti-settling agent.

TEST METHODS

The Hercules Hi Shear Viscometer used to determine rheological characteristics of the slurries is a viscometer which has a shaft turning in a cup that holds the slurry. A rheogram or graph is produced by this instrument by plotting shear rate (r.p.m.) versus shear stress (Torquedyne cm.). The Hercules Rheogram data recorded below are the shear stress in dyne cm.$\times 10^{-5}$ (using A-Bob) at the maximum shear rate (1100 r.p.m.).

The value "percent settled" is determined by placing a weighed amount of slurry in a first weighed jar for a period of 20 days. This jar is then inverted for a 10-second period over a a second weighed jar. The first jar is then reweighed to determine the amount of "cake" adhering to it. The surry in the second jar is then returned to the first jar and the second jar is reweighed to determine the amount of material lost in the test. The values reported are determined following the equation Percent settled =

$$\frac{\text{weight of ``cake''} - \text{correction for lost material} \times 100}{\text{weight of slurry}}$$

The "rolled" value is obtained upon a sample rolled for 10 minutes at 100 r.p.m. prior to the settling evaluation. The "not rolled" value is obtained without the prior rolling treatment.

The following examples are cited to illustrate the invention. They are not intended to limit it in any manner. In each of the examples, except as noted, anatase TiO₂ prepared by hydrolysis of a titanium sulfate solution, followed by washing of the hydrolysate and calcination of about 900° C. in a continuous calciner is treated with triethanolamine by dripping a triethanolamine-water solution onto the calcined pigment and the treated pigment is then ground in a fluid energy type mill. Sufficient triethanolamine-water solution is added so that 0.17%, based on the weight of the pigment of triethanolamine is absorbed on the surface of the pigment particles. Micronizing the triethanolamine treated pigment disperses the triethanolamine throughout the pigment. Thereafter sufficient of the treated pigment is added, with agitation, to water containing the polysaccharide anti-settling agent to provide a slurry containing 70% by weight TiO₂. After the addition of the pigment is complete, the slurry is agitated for 30 minutes to insure good dispersion of the pigment and antisettling agent in the water. A series of slurries is prepared containing different anti-settling agents at the concentrations indicated in Table I.

TABLE I

| Example | Anti-settling agent | Percent anti-settling agent [1] | Percent settled | | Hercules Rheogram (rolled) |
|---|---|---|---|---|---|
| | | | Not rolled | Rolled | |
| 1 | CMC [2] | 0.05 | 28.4 | 6.87 | 0.8 |
| 2 | CMC [2] | 0.10 | 13.3 | 3.79 | 1.1 |
| 3 | CMC [2] | 0.15 | 9.8 | 1.34 | 1.9 |
| 4 | Kelzan [3] | 0.05 | 29.4 | 8.90 | 0.9 |
| 5 | Kelzan [3] | 0.10 | 3.8 | 0.89 | 1.8 |
| 6 | Kelzan [3] | 0.15 | 3.1 | 0.00 | 3.0 |
| 7 | None | | 53.0 | 46.7 | 9.3 |

[1] By weight based on the weight of the treated TiO₂.
[2] Sodium carboxymethyl cellulose.
[3] A polysaccharide gum sold by the Kelco Co. of Clark, N.J.

The examples in Table II illustrate the critical nature of the amine dispersing agent in providing suitable flow characteristics to the compositions of the present invention, a rating approaching zero indicating a low viscosity.

TABLE II

| Example | Anti-settling agent | Percent anti-settling agent | Percent TEA | Hercules Rheogram |
|---|---|---|---|---|
| 8 | Kelzan | 0.1 | 0.15 | 2.9 |
| 9 | CMC | 0.1 | 0.15 | 3.7 |
| 10 | None | 0.0 | 0.15 | 1.7 |
| 11 | Kelzan | 0.1 | 0.00 | 44.0 |
| 12 | CMC | 0.1 | 0.00 | 52.0 |
| 13 | None | 0.0 | 0.00 | 19.0 |

When wet ground $TiO_2$ anatase pigment or rutile $TiO_2$ pigment is substituted for the dry-ground anatase used in the compositions of the present invention described above, a viscous, unpumpable product, often in gelled form, results.

MODIFICATIONS AND EQUIVALENTS

Pigmentary $TiO_2$ suitable for use in this invention is dry-milled and of the anatase form produced by the well known sulfate process for the production of $TiO_2$. The type of dry milling used is not important. A common dry milling method is by a fluid energy type mill or micronizer. Other dry milling methods, such as milling with a ring roll mill can be used.

Any amine dispersing agents such as triethylamine, ethylenediamine or triethanolamine titanium chelate ("Tyzor" TE, sold by E. I. du Pont de Nemours and Co.) may be used as the $TiO_2$ dispersing agent in the compositions of the present invention. However, triethanolamine is preferred. Other trialkanolamines such as trimethanolamine, tripropanolamine, and tributanolamine and mixtures of such amines are also useful, particularly those having molecular weights from about 107 to about 233. Commercial triethanolamine, which contains 80-85% of triethanolamine, about 15% of diethanolamine and 1.0 to 2.5% of monoethanolamine is preferred. While as little as 0.05% by weight based on $TiO_2$ pigment of the dispersing agent is effective generally it is preferred to use at least 0.1%. Larger percentages may be used but usually an amount above 1% is not economically desirable. It has been found most efficient to add the dispersing agent to the $TiO_2$ before the milling operation.

The polysaccharide anti-settling agent may be a polysaccharide gum, the alkali salt of carboxymethylcellulose including the sodium, potassium, lithium, and ammonium salts as well as cellulose ethers (such as "Natrasol," sold by Hercules, Inc.) and saccharide complexes (such as "Specialty 287" sold by Baker Castor Oil Co.). Generally, use of from about 0.05 to about 0.2% by weight based on the weight of the pigment in the slurry has been found to be most effective. Larger amounts, up to about 1% may sometimes be desirable.

Both the dispersing agent and the antisettling agent can be added to the $TiO_2$ pigment prior to dry-grinding the pigment or they may be added directly to the pigment-water slurry. The preferred method is to add the triethanolamine as a water solution to the dry pigment before it is dry ground and to add the antisettling agent to the pigment-water slurry.

Many equivalent modifications will become apparent to those skilled in the art from a reading of the above without a departure from the inventive concept.

What is claimed is:

1. A high solids, aqueous slurry of $TiO_2$ pigment containing (1) from about 60% to about 80% by weight of dry-finished anatase pigment bearing from about 0.05% to about 1% by weight, based on the weight of the said pigment, of an amine as a dispersing agent and (2) from about 0.01% to about 1% by weight, based on the weight of the said pigment, of a polysaccharide as an anti-settling agent.

2. The slurry of claim 1 wherein the pigment bears from 0.1% to 0.5% by weight based on the weight of the said pigment of triethanolamine.

3. The slurry of claim 1 containing from 0.05% to 0.15% by weight based on the weight of the said pigment of a polysaccharide gum as an anti-settling agent.

4. The slurry of claim 1 containing from 0.05% to 0.15% by weight based on the weight of the said pigment of sodium carboxymethylcellulose as an anti-settling agent.

5. The slurry of claim 3 wherein the said pigment bears 0.17% by weight based on the weight of the said pigment of the said triethanolamine.

6. The slurry of claim 5 containing 0.1% by weight based on the weight of the said pigment of a polysaccharide gum.

7. A process for preparing the slurry of claim 1 comprising dry-milling a calcined anatase $TiO_2$ pigment bearing from about 0.05% to about 1% of an amine as a dispersing agent and thereafter adding, with agitation, the said pigment to water containing from about 0.01% to about 1% by weight of a polysaccharide anti-settling agent, sufficient of the said pigment being added to provide a $TiO_2$ content in the said slurry of from about 60% to about 80% by weight.

References Cited

UNITED STATES PATENTS

| 2,737,460 | 3/1956 | Werner | 106—300 |
| 2,744,029 | 5/1956 | Kingsbury | 106—300 |
| 3,015,573 | 1/1962 | Myers et al. | 106—300 |
| 3,205,085 | 9/1965 | Bailin | 106—300 |
| 3,345,187 | 10/1967 | Binnis | 106—300 XR |
| 3,412,944 | 11/1968 | Wollenberg | 106—300 XR |
| 2,933,408 | 4/1960 | Dempster et al. | 106—300 |

FOREIGN PATENTS

| 1,017,475 | 1/1966 | Great Britain. |
| 1,025,960 | 4/1966 | Great Britain. |

HELEN M. McCARTHY, Primary Examiner

H. M. S. SNEED, Assistant Examiner

U.S. Cl. X.R.

106—308; 260—209